United States Patent
Li (10) Patent No.: US 9,520,908 B2
(45) Date of Patent: Dec. 13, 2016

(54) FULL-DUPLEX RADIO COMMUNICATION DEVICE, METHOD AND SYSTEM

(71) Applicant: Huawei Technologies Co., Ltd., Shenzhen (CN)

(72) Inventor: Yungang Li, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 191 days.

(21) Appl. No.: 14/509,382

(22) Filed: Oct. 8, 2014

(65) Prior Publication Data

US 2015/0023225 A1 Jan. 22, 2015

Related U.S. Application Data

(63) Continuation of application No. PCT/CN2012/084105, filed on Nov. 5, 2012.

(30) Foreign Application Priority Data

Apr. 9, 2012 (CN) .......................... 2012 1 0101953

(51) Int. Cl.
  *H04B 1/04* (2006.01)
  *H04L 5/14* (2006.01)
  *H04B 1/525* (2015.01)

(52) U.S. Cl.
  CPC ............ *H04B 1/0475* (2013.01); *H04B 1/525* (2013.01); *H04L 5/14* (2013.01)

(58) Field of Classification Search
  CPC . H04B 7/15571; H04B 7/15585; H01Q 21/00; H01Q 3/2605; H04L 5/14; H04L 27/2614
  See application file for complete search history.

(56) References Cited

U.S. PATENT DOCUMENTS

2007/0053414 A1  3/2007  Payne et al.
2010/0195543 A1  8/2010  Jung et al.
(Continued)

FOREIGN PATENT DOCUMENTS

CN   1781259 A    5/2006
CN   101267065 A  9/2008
(Continued)

OTHER PUBLICATIONS

Foreign Communication From a Counterpart Application, Chinese Application No. 201210101953.8, Chinese Office Action dated Sep. 29, 2015, 5 pages.

(Continued)

*Primary Examiner* — Ayaz Sheikh
*Assistant Examiner* — Debebe Asefa
(74) *Attorney, Agent, or Firm* — Conley Rose, P.C.

(57) ABSTRACT

A full-duplex radio communication device, method and system are provided. A first polarized antenna in a dual-polarized antenna outputs a transmitted signal, and a second polarized antenna acquires a received signal which includes a first transmitted sub-signal that is directly coupled from the first polarized antenna. An analog domain cancellation module acquires a second transmitted sub-signal coupled from the transmitted signal, adjusts an amplitude and a phase parameter of the second transmitted sub-signal to convert the second transmitted sub-signal into a third transmitted sub-signal, eliminates the first transmitted sub-signal according to the third transmitted sub-signal, samples the received signal, from which the first transmitted sub-signal is eliminated, as a first digital signal, samples the second transmitted sub-signal as a second digital signal, and outputs the first digital signal and the second digital signal to a digital domain cancellation module.

11 Claims, 5 Drawing Sheets

(56) References Cited

U.S. PATENT DOCUMENTS

| | | | |
|---|---|---|---|
| 2011/0136445 | A1 | 6/2011 | Lee et al. |
| 2011/0151908 | A1 | 6/2011 | Hirabe |
| 2011/0216813 | A1* | 9/2011 | Baldemair ......... H04B 7/15564 375/211 |
| 2012/0147790 | A1* | 6/2012 | Khojastepour ...... H01Q 3/2605 370/277 |

FOREIGN PATENT DOCUMENTS

| | | |
|---|---|---|
| CN | 101291152 A | 10/2008 |
| CN | 102111177 A | 6/2011 |
| CN | 102144361 A | 8/2011 |
| EP | 1024551 A2 | 8/2000 |
| EP | 1863187 A2 | 12/2007 |
| GB | 2372902 A | 9/2002 |
| KR | 20100137837 A | 12/2010 |
| WO | 0229987 A1 | 4/2002 |
| WO | 2004098085 A1 | 11/2004 |
| WO | 2011148341 A1 | 12/2011 |

OTHER PUBLICATIONS

Choi, J., "Acheiving Single Channel, Full Duplex Wireless Communication", Proceedings of the 16th Annual International Conference on Mobile Computing and Networking (Mobicom 2010), Sep. 2010, 12 pages.

Jain, M., "Practical, Real-time, Full Duplex Wireless", MobiCom '11 Proceedings of the 17th annual international conference on Mobile computing and networking, Sep. 19-23, 2011, 12 pages.

Foreign Communication From a Counterpart Application, PCT Application No. PCT/CN2012/084105, English Translation of International Search Report dated Feb. 28, 2013, 2 pages.

Foreign Communication From a Counterpart Application, PCT Application No. PCT/CN2012/084105, English Translation of Written Opinion dated Feb. 28, 2013, 6 pages.

Foreign Communication From a Counterpart Application, European Application No. 12874058.6, Extended European Search Report dated Jan. 20, 2015, 6 pages.

* cited by examiner

FULL-DUPLEX RADIO COMMUNICATION DEVICE, METHOD AND SYSTEM

CROSS-REFERENCE TO RELATED APPLICATIONS

This application is a continuation of International Application No. PCT/CN2012/084105, filed on Nov. 5, 2012, which claims priority to Chinese Patent Application No. 201210101953.8, filed on Apr. 9, 2012, both of which are hereby incorporated by reference in their entireties.

TECHNICAL FIELD

The present invention relates to the field of radio communications technologies, and in particular, to a full-duplex radio communication device, method and system.

BACKGROUND

A spectrum is a valuable resource, and a radio communication system is engaged in introducing more complicated technologies to improve use efficiency of the spectrum, including time-division multiple access (TDMA), code-division multiple access (CDMA), orthogonal frequency division multiplexing (OFDM), and new encoding and decoding. Subsequent introduction of a multi-antenna multiple-input multiple output (MIMO) system and technologies such as joint processing of multiple cells improve the use efficiency of the spectrum. For the use of the spectrum in a current radio communication system, a duplex manner is divided into modes such as time division multiplexing (TDD), frequency division multiplexing (FDD), and half-duplex FDD (H-FDD), that is, it is separated in a frequency domain, or separated in time to perform receiving and sending, which cannot implement receiving and sending at a same frequency or same time, that is, the full-duplex mode. In addition, due to a path loss of air interface transmission of a radio signal, in a same node the transmitting power of a transmitted signal at an antenna port is far greater than that of a received signal from another node in distance, thereby leading to problems that a receiver is blocked, a sampling bit-width and a dynamic range of a signal after analog-to-digital conversion (ADC) are limited, or a signal-to-noise ratio is too low to demodulate a correct signal, and a system cannot work normally. Therefore, in normal circumstances, the full-duplex communication cannot work normally by using duplex modes such as the FDD and the TDD.

In the prior art for implementing full-duplex communication (performing receiving and sending at a same frequency and same time), usually two transmitting antennas and one receiving antenna are adopted. The distance between the two transmitting antennas and the receiving antenna is adjusted, and null elimination is formed at a receiving port, thereby achieving an effect of elimination of an interfering signal around 30 decibels (dB) coupled from a transmitting channel to a receiving channel. Further, through an interference elimination component in an analog domain and by eliminating the interfering signal in a digital domain, a 30 to 35 dB interfering signal coupled by a transmitting channel signal may be eliminated. However, problems such as high requirements on the number of antennas and position accuracy, a limited interfering signal elimination effect, and a high cost still exist.

SUMMARY

An objective of embodiments of the present invention is to provide a full-duplex radio communication device, method and system, so as to solve problems of high requirements on the number of antennas and position accuracy, a limited interfering signal elimination effect, and a high cost when full-duplex radio communication is implemented through the prior art.

An embodiment of the present invention is implemented in this way, where a full-duplex radio communication device is provided, and the device includes a dual-polarized antenna, an analog domain cancellation module and a digital domain cancellation module, in which a first polarized antenna in the dual-polarized antenna is configured to output a transmitted signal, and a second polarized antenna is configured to acquire a received signal, where the received signal includes a wanted signal and a first transmitted sub-signal that is directly coupled from the first polarized antenna through an air interface; the analog domain cancellation module is configured to acquire a second transmitted sub-signal coupled by the transmitted signal output from the first polarized antenna, adjust an amplitude and a phase parameter of a second transmitted sub-signal to convert the second transmitted sub-signal into a third transmitted sub-signal, eliminate, according to the third transmitted sub-signal, the first transmitted sub-signal in the received signal acquired by the second polarized antenna, sample the received signal, from which the first transmitted sub-signal is eliminated, as a first digital signal, and output the first digital signal to the digital domain cancellation module, sample the second transmitted sub-signal as a second digital signal at the same time, and output the second digital signal to the digital domain cancellation module; and the digital domain cancellation module is configured to eliminate the second digital signal in the first digital signal, and output the first digital signal from which the second digital signal is eliminated.

Another objective of the embodiments of the present invention is to provide a full-duplex radio communication method, where the method includes following steps: outputting, by a first polarized antenna in a dual-polarized antenna, a transmitted signal, and acquiring, by a second polarized antenna in the dual-polarized antenna, a received signal, where the received signal includes a wanted signal and a first transmitted sub-signal that is directly coupled from the first polarized antenna through an air interface; acquiring a second transmitted sub-signal coupled by the transmitted signal output from the first polarized antenna, and adjusting an amplitude and a phase parameter of the second transmitted sub-signal to convert the second transmitted sub-signal into a third transmitted sub-signal; eliminating, according to the third transmitted sub-signal, the first transmitted sub-signal in the received signal acquired by the second polarized antenna, and sampling the received signal, from which the first transmitted sub-signal is eliminated, as a first digital signal; and sampling the second transmitted sub-signal as a second digital signal, eliminating the second digital signal in the first digital signal, and outputting the first digital signal from which the second digital signal is eliminated.

Another objective of the embodiments of the present invention is to provide a system including the full-duplex radio communication device.

In the embodiments of the present invention, the dual-polarized antenna is adopted in the full-duplex radio communication device, and through orthogonal isolation between the dual-polarized antennas, the condition of high requirements on the antenna position and the number of the antennas in the prior art may be avoided. The dual-polarized antenna is capable of reducing the interference strength of the first transmitted sub-signal directly coupled by a polarized antenna, thereby implementing isolation of a certain amount of the interfering signals. Further, the analog domain cancellation module and the digital domain cancellation module are combined, thereby further reducing the interfering signal, and solving problems of the high requirements on the number of antennas and position accuracy, the limited interfering signal elimination effect, and the high cost when the full-duplex radio communication is implemented through the prior art, so that the interfering signal is effectively eliminated, and the system cost is reduced in the prerequisite that the full-duplex radio communication is ensured.

DETAILED DESCRIPTION

To make the objectives, technical solutions, and advantages of the present invention more comprehensible, the following further describes the present invention in detail with reference to the accompanying drawings and embodiments. It is understandable that the specific embodiment is merely used to explain the present invention and is not intended to limit the present invention.

In the embodiments of the present invention, an isolation feature of a polarized antenna is introduced to a full-duplex radio communication technology, where a digital and analog combined cancellation technology of a feedback channel is combined, thereby effectively eliminating an interfering signal coupled from a transmitting channel to a receiving channel, getting rid of a problem of being affected by the number of antennas and position accuracy in the prior art while implementing full-duplex communication of performing receiving and sending at a same frequency and same time, further enhancing an interfering signal elimination effect, and reducing the use cost of the antenna.

Specific implementation of the present invention is described in detail with reference to specific embodiments in the following.

Embodiment 1

Figure 1:
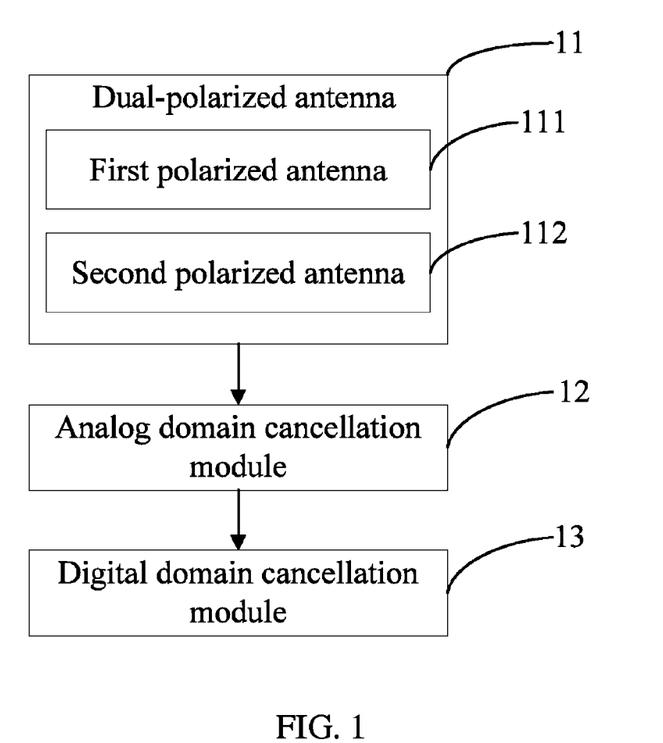
FIG. 1 is a structural diagram of a full-duplex radio communication device provided by a first embodiment of the present invention.

FIG. 1 shows a structure of a full-duplex radio communication device provided by a first embodiment of the present invention, and for ease of description, only a part relevant to the embodiment of the present invention is shown.

The full-duplex radio communication device may be applied to a point-to-point radio communication system, for example, a microwave communication system and so on, or applied to other full-duplex radio communication systems, and may also be extensively applied to a cellular communication system and so on. The full-duplex radio communication device includes a dual-polarized antenna 11, an analog domain cancellation module 12, and a digital domain cancellation module 13.

A first polarized antenna 111 in the dual-polarized antenna 11 is configured to output a transmitted signal, and a second polarized antenna 112 is configured to acquire a received signal, where the received signal includes a wanted signal and a first transmitted sub-signal directly coupled from the first polarized antenna 111 through an air interface.

In the embodiment of the present invention, in the dual-polarized antenna, physical positions of the first polarized antenna 111 and the second polarized antenna 112 may be put together, so as to reduce the volume and size, and the two antennas are in orthogonal polarization, where one may be a +45 degrees polarized antenna and the other may be a −45 degrees polarized antenna, or one is vertically polarized and the other is horizontally polarized, or in other orthogonally polarized manners. The number of the antennas may be extended to multi-antenna configuration, for example, N transmitting antennas and N receiving antennas, and orthogonal polarization isolation is adopted between the transmitting and receiving antennas, that is, the number of the antennas may be extended to N dual-polarized antennas adopted at N transmitting channels and N receiving channels, thereby implementing full-duplex communication under MIMO. In the embodiment of the present invention, the dual-polarized antenna is introduced to the full-duplex communication device, and for an antenna side only, an effect of elimination of an interfering signal around 30 dB may be achieved. With respect to the problems of high requirements on the number of antennas and position accuracy, a limited coupled signal elimination effect, and a high cost in the prior art, in the embodiment of the present invention, and under the prerequisite that a desirable interfering signal elimination effect is ensured, the limitation of the strict requirement on the antenna position is overcome, and only two polarized antennas are used, thereby reducing the use cost of the antenna, improving practicality of the full-duplex communication, and achieving high practical and promotional values in a microwave communication system and so on.

The analog domain cancellation module 12 is configured to acquire a second transmitted sub-signal coupled by the transmitted signal output from the first polarized antenna 111, adjust an amplitude and a phase parameter of the second transmitted sub-signal to convert the second transmitted sub-signal into a third transmitted sub-signal, eliminate, according to the third transmitted sub-signal, the first transmitted sub-signal in the received signal acquired by the second polarized antenna 112, sample the received signal, from which the first transmitted sub-signal is eliminated, as a first digital signal, and output the first digital signal to the digital domain cancellation module 13, sample the second transmitted sub-signal as a second digital signal at the same time, and output the second digital signal to the digital domain cancellation module 13.

Figure 2:
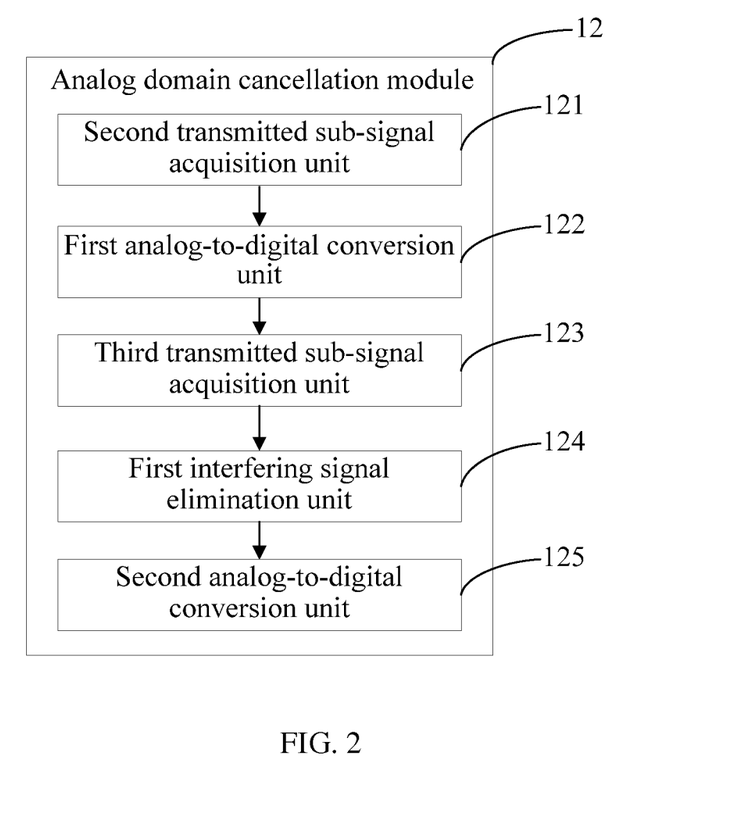
FIG. 2 is a specific structural diagram of an analog domain cancellation module provided by a first embodiment of the present invention.

As shown in FIG. 2, the analog domain cancellation module 12 includes: a second transmitted sub-signal acquisition unit 121 configured to acquire, through a preset coupling circuit, the second transmitted sub-signal coupled by the transmitted signal output from the first polarized antenna 111; a first analog-to-digital conversion unit 122 configured to convert the second transmitted sub-signal into the second digital signal through analog-to-digital conversion, and output the second digital signal to the digital domain cancellation module 13; a third transmitted sub-signal acquisition unit 123 configured to adjust an amplitude and a phase parameter of the second transmitted sub-signal according to the amplitude and the phase parameter sent from the digital domain cancellation module 13, to convert the second transmitted sub-signal into the third transmitted sub-signal; a first interfering signal elimination unit 124 configured to use the third transmitted sub-signal to eliminate the first transmitted sub-signal in the received signal acquired by the second polarized antenna 112; and a second analog-to-digital conversion unit 125 configured to convert the received signal, from which the first transmitted sub-signal is eliminated, into the first digital signal through analog-to-digital conversion, and output the first digital signal to the digital domain cancellation module 13.

In the embodiment of the present invention, in a full-duplex radio communication process, it is assumed that the transmitted signal, after being processed by the transmitting channel, is transmitted at an antenna port of the first polarized antenna 111, where the output transmitted signal is marked as Yout(t). The second transmitted sub-signal acquisition unit 121 may couple back, through the coupling circuit, a part of the transmitted signal output by the first polarized antenna 111, where the strength or the amplitude of the coupled signal may be adjusted, and the coupled signal is marked as the second transmitted sub-signal Yfb(t). At this time, the second transmitted sub-signal Yfb(t) is divided into two to be output, where one undergoes processing such as reversing, gain processing and delay adjustment in an analog domain, and the other second transmitted sub-signal Yfb(t) is converted into the second digital signal after undergoing sampling and mode conversion through the first analog-to-digital conversion unit 122, and is marked as Yfb(n). The Yfb(n) is output to the digital domain cancellation module 13 in the full-duplex radio communication device, and specifically, may serve as an input signal of an interference elimination controller preset in the digital domain cancellation module 13. In addition, the interference elimination controller outputs an amplitude g(t) and a phase parameter t0 to the third transmitted sub-signal acquisition unit 123 at the same time, and the third transmitted sub-signal acquisition unit 123 adjusts the amplitude and the phase parameter of the second transmitted sub-signal according to the amplitude and the phase parameter, to convert the second transmitted sub-signal into the third transmitted sub-signal Yic(t2)=−g(t)*Yfb(t−t0), where it should be noted that "−" identifies that reverse adjustment is performed on the second transmitted sub-signal. For the reverse adjustment, the adjustment may be performed through the phase parameter, or a reverse adjustment unit may be disposed independently.

After the third transmitted sub-signal Yic(t2) is acquired, interfering signal elimination is required to be performed on the received signal acquired by the second polarized antenna 112, where the received signal includes a wanted signal Xin(t1) and the first transmitted sub-signal Ycoup(t1) that is directly coupled from the first polarized antenna through the air interface. Specifically, since the wanted signal Xin(t1) and the signal Ycoup(t1) that is directly coupled by the transmitting antenna through the air interface may be received at the antenna port of the receiving channel, Ycoup(t1) is in strong correlation with the transmitted signal Yout(t) of the transmitting antenna, and the difference only lies in an amplitude Aant, a propagation phase delay t0 of distance and signal attenuation of antenna polarized isolation, Ycoup(t1)=Aant*Yout(t+t0). The first interfering signal elimination unit 124 is used, so that the interfering signal in the received signal is eliminated through the third transmitted sub-signal, that is, the third transmitted sub-signal Yic(t2), Ycoup(t1), and the wanted signal Xin(t1) may pass through a synthesizer, thereby implementing second level interfering signal elimination after first level antenna polarization isolation of the interfering signal, and finally the interfering signal coupled by the transmitted signal to the receiving channel is further effectively reduced, and the wanted signal Xin(t1) may be demodulated normally.

In the embodiment of the present invention, the second analog-to-digital conversion unit 125 is used to convert the received signal, from which the first transmitted sub-signal is eliminated, into the first digital signal through analog-to-digital conversion, and output the first digital signal to the digital domain cancellation module 13, where the first digital signal may be marked as X(n)=Xin(n)+Ycoup(n)+Yic(n).

The digital domain cancellation module 13 is configured to eliminate the second digital signal in the first digital signal, and output the first digital signal from which the second digital signal is eliminated.

Figure 3:
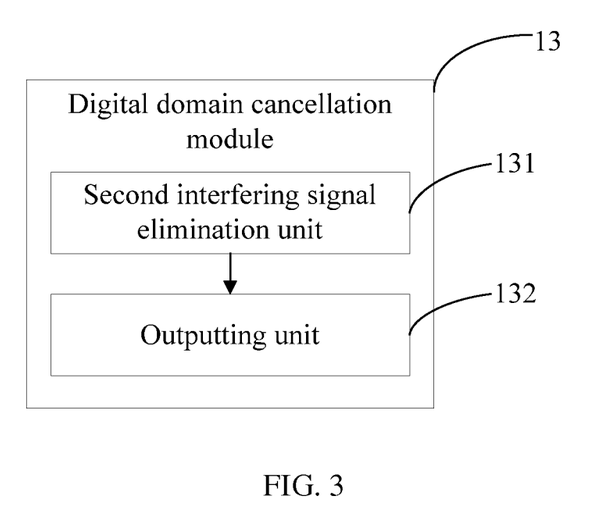
FIG. 3 is a specific structural diagram of a digital domain cancellation module provided by a first embodiment of the present invention.

As shown in FIG. 3, the digital domain cancellation module 13 includes: a second interfering signal elimination unit 131 configured to eliminate the second digital signal in the first digital signal through the preset interference elimination controller; and an outputting unit 132 configured to output the first digital signal, from which the second digital signal is eliminated, and send the amplitude and the phase parameter to the analog domain cancellation module 12.

In the embodiment of the present invention, the second interfering signal elimination unit 131 receives Yfb(n) and X(n) sent by the first analog-to-digital conversion unit 122 and the second analog-to-digital conversion unit 125 of the analog domain cancellation module 12. With the preset interference elimination controller, the second digital signal in the first digital signal is eliminated in a digital signal field. The digital signal X'(n)=X(n)−Yfb(n), from which the interfering signal being the second digital signal is eliminated, is acquired, and X'(n), after being converted into a baseband signal through a digital down converter (DDC), is transmitted to a base band processing unit (BBU) for subsequent processing such as signal demodulation. The transmitted signal, after undergoing processing such as signal modulation and encoding through a BBU, and being processed through a digital intermediate frequency crest factor ratio (CFR) elimination unit, a digital up converter (DUC), a digital pre-distortional (DPD), a digital-to-analog converter (DAC), and a frequency mixer, is transmitted through a transmitting polarized antenna after passing through the transmitting channel. At the same time, the outputting unit 132 may be used to feed back the amplitude and the phase parameter to the third transmitted sub-signal acquisition unit 123 of the analog domain cancellation module 12, so as to adjust the amplitude and the phase parameter of the second transmitted sub-signal according to the obtained amplitude and phase parameter to convert the second transmitted sub-signal into the third transmitted sub-signal. The digital domain cancellation module 13 is equivalent to third level elimination for eliminating the interfering signal, that is, on the basis of the second level analog domain interfering signal elimination, combined elimination design with the digital domain is added, thereby further improving the interference elimination effect.

In the embodiment of the present invention, the full-duplex radio communication device adopts a dual-polarized antenna, where one is configured to transmit a signal, and the other is configured to receive a signal. The transmitting antenna and the receiving antenna are in orthogonal polarization, and may be +45 degrees and −45 degrees polarized, or horizontally polarized and vertically polarized, or in other orthogonally polarized manners. Through orthogonal isolation between the dual-polarized antennas, the interfering signal coupled by the transmitted signal to the receiving channel is reduced. Further, through analog and digital cancellation, the interfering signal coupled by the transmitted signal to the receiving channel is effectively reduced, so that the wanted signal is normally demodulated. And through a dual-polarized antenna, a full-duplex radio communication device performing receiving and sending at the same frequency and same time is implemented so as to improve the use efficiency of the spectrum, reduce the cost, and effectively improve the practicality of full-duplex communication, achieving practical and promotional values in a microwave system and so on.

Embodiment 2

Figure 4:
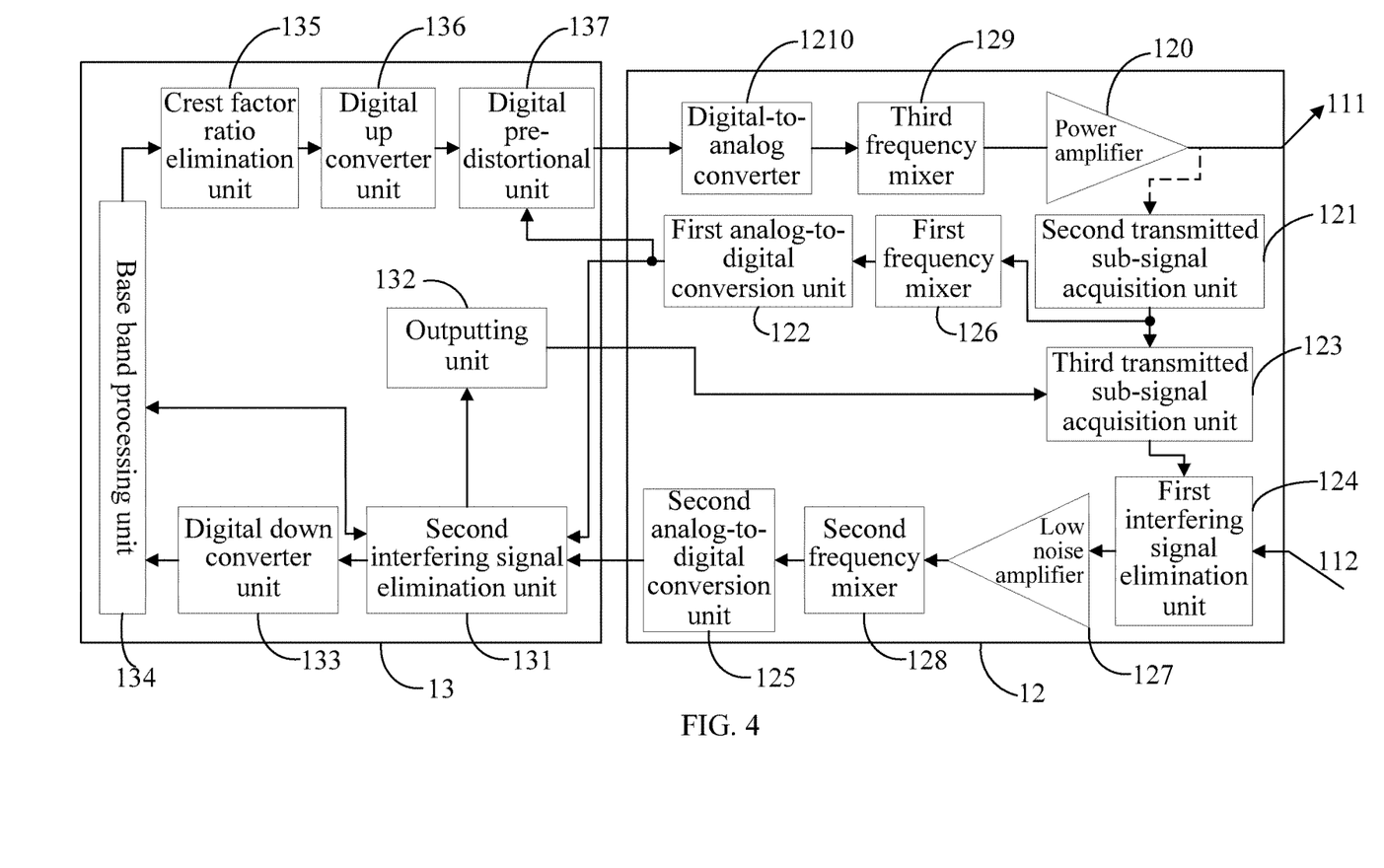
FIG. 4 is a structural diagram of a full-duplex radio communication device provided by a second embodiment of the present invention.

FIG. 4 shows a structure of a full-duplex radio communication device provided by a second embodiment of the present invention, and for ease of description, only a part relevant to the embodiment of the present invention is shown. As an embodiment of the present invention, the embodiment shown in FIG. 4 is a structure further implemented on the basis of foregoing Embodiment 1.

In the embodiment of the present invention, a first polarized antenna 111, a second polarized antenna 112, a second transmitted sub-signal acquisition unit 121, a first analog-to-digital converter 122, a third transmitted sub-signal acquisition unit 123, a first interfering signal elimination unit 124, a second analog-to-digital converter 125, a second interfering signal elimination unit 131, and an outputting unit 132 in a preset dual-polarized antenna in FIG. 4 are one-to-one corresponding to the first polarized antenna 111, the second polarized antenna 112, the second transmitted sub-signal acquisition unit 121, the first analog-to-digital conversion unit 122, the third transmitted sub-signal acquisition unit 123, the first interfering signal elimination unit 124, the second analog-to-digital conversion unit 125, the second interfering signal elimination unit 131, and the outputting unit 132 in foregoing Embodiment 1, so the details will not be described herein again.

A connection relationship in the embodiment of the present invention is as follows. An input end of the second transmitted sub-signal acquisition unit 121 is wirelessly coupled to an output end of a power amplifier 120. An output end of the second transmitted sub-signal acquisition unit 121 is connected an input end of a first frequency mixer 126 and a first input end of the third transmitted signal acquisition unit 123 at the same time. An output end of the first frequency mixer 126 is connected to an input end of the first analog-to-digital converter 122. An output end of the first analog-to-digital converter 122 is connected to a first input end of a digital pre-distortional unit 137 and a first input end of the second interfering signal elimination unit 131 at the same time. A second input end of the third transmitted signal acquisition unit 123 is connected to an input end of the outputting unit 132 and an output end of the third transmitted signal acquisition unit 123 is connected to a first input end of the first interfering signal elimination unit 124. A second input end of the first interfering signal elimination unit 124 is connected to the second polarized antenna 112. An output end of the first interfering signal elimination unit 124 is connected to an input end of a low noise amplifier 127. An output end of the low noise amplifier 127 is connected to an input end of a second frequency mixer 128, and an output end of the second frequency mixer 128 is connected to an input end of the second digital-to-analog converter 125. An output end of the second digital-to-analog converter 125 is connected to a second input end of the second interfering signal elimination unit 131. A third input end of the second interfering signal elimination unit 131 is connected to a first output end of a base band processing unit 134, and a first output end of the second interfering signal elimination unit 131 is connected to the input end of the outputting unit 132. A second output end of the second interfering signal elimination unit 131 is connected to an input end of a digital down converter unit 133. A third output end of the second interfering signal elimination unit 131 is also connected to a second input end of the base band processing unit 134. An output end of the digital down converter unit 133 is connected to a first input end of the base band processing unit 134, and an output end of the base band processing unit 134 is connected to an input end of a crest factor ratio elimination unit 135. An output end of the crest factor ratio elimination unit 135 is connected to an input end of a digital up converter unit 136. An output end of the digital up converter unit 136 is connected to a second input end of the digital pre-distortional unit 137. An output end of the digital pre-distortional unit 137 is connected to an input end of a digital-to-analog converter 1210. The digital-to-analog converter 1210 is connected to an input end of a third frequency mixer 129. An output end of the third frequency mixer 129 is connected to an input end of the power amplifier 120. An output end of the power amplifier 120 is connected to the first polarized antenna 111.

In the analog domain cancellation module 12, in a full-duplex radio communication process, it is assumed that, a transmitted signal, after being processed by a transmitting channel, is transmitted at an antenna port of the first polarized antenna 111, where the output transmitted signal is marked as Yout(t). A coupling circuit is designed behind the power amplifier 120, that is, the power amplifier 120, and in front of the antenna port of the first polarized antenna 111. A part of the transmitted signal output by the first polarized antenna 111 may be coupled back through the second transmitted sub-signal acquisition unit 121, where the coupled signal is marked as a second transmitted sub-signal Yfb(t). At this time, Yfb(t) is divided into two to be output, one Yfb(t) signal is converted into a second digital signal after undergoing sampling and mode conversion performed by the first frequency mixer 126 configured to combine a radio frequency signal and an intermediate frequency signal and the first digital-to-analog converter 122, and is marked as Yfb(n). The Yfb(n) is output to the digital pre-distortional unit 137 and the second interfering signal elimination unit 131 respectively. The other Yfb(t) signal is output to the third transmitted sub-signal acquisition unit 123, and then the third transmitted sub-signal acquisition unit 123 adjusts the amplitude and the phase parameter of the second transmitted sub-signal according to the amplitude and the phase parameter output by the outputting unit of the digital domain cancellation module 13, to convert the second transmitted sub-signal into a third transmitted sub-signal Yic(t2)=−g(t)*Yfb(t−t0). Therefore, the first interfering signal elimination unit 124 is used to perform interfering signal elimination on a received signal acquired by the second polarized antenna 112, where the received signal includes a wanted signal Xin(t1) and a first transmitted sub-signal Ycoup(t1) directly coupled from the first polarized antenna through the air interface. The Ycoup(t1) is in strong correlation with a transmitted signal Yout(t) of a transmitting antenna, where the difference only lies in an amplitude Aant, a propagation phase delay t0 of distance and signal attenuation of antenna polarized isolation, Ycoup(t1)=Aant*Yout(t+t0). The low noise amplifier 127, the second frequency mixer 128, and the second analog-to-digital conversion unit 125 are used to convert the received signal, from which the first transmitted sub-signal is eliminated, into the first digital signal through analog-to-digital conversion, and output the first digital signal to the second interfering signal elimination unit 131, where the first digital signal may be marked as X(n)=Xin (n)+Ycoup(n)+Yic(n).

In the digital domain cancellation module 13, the second interfering signal elimination unit 131 mainly eliminates the second digital signal in the first digital signal according to the received Yfb(n) and X(n), and acquires a digital signal X'(n)=X(n)−Yfb(n) from which the interfering signal being the second digital signal is eliminated. After X'(n) is processed by the digital down converter unit 133, the base band processing unit 134, the crest factor ratio elimination unit 135, the digital up converter unit 136, the digital pre-distortional unit 137, the digital-to-analog converter 1210 in the analog domain cancellation module 12, the third frequency mixer 129, and the power amplifier 120, the transmitted signal is output through the first polarized antenna 111. In addition, the outputting unit 132 may also send the amplitude and the phase parameter generated by the second interfering signal elimination unit 131 to the third transmitted signal acquisition unit 123.

In the embodiment of the present invention, the full-duplex radio communication device implements a full-duplex radio communication system performing receiving and sending at the same frequency and same time through a transmitting channel, a receiving channel, a dual-polarized antenna, plus the analog domain cancellation module and the digital domain cancellation module.

Embodiment 3

Figure 5:
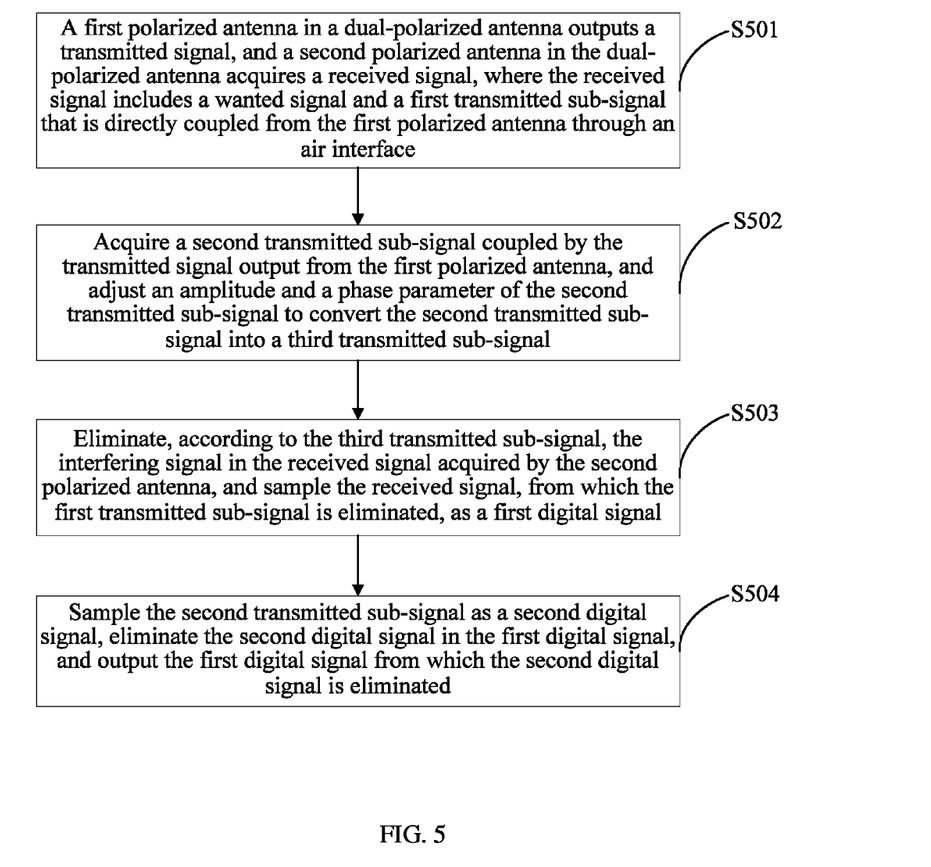
FIG. 5 is an implementation flow chart of a full-duplex radio communication method provided by a third embodiment of the present invention.

FIG. 5 shows an implementation flow of a full-duplex radio communication method provided by a third embodiment of the present invention, where the details are as follows.

In step S501, a first polarized antenna in a dual-polarized antenna outputs a transmitted signal, and a second polarized antenna in the dual-polarized antenna acquires a received signal, where the received signal includes a wanted signal and a first transmitted sub-signal directly coupled from the first polarized antenna through an air interface.

In a specific implementation process, usually the dual-polarized antennas are a +45 degrees and −45 degrees polarized antenna, or horizontally polarized and vertically polarized antennas, or other orthogonally polarized antennas. However, cancellation may be achieved without accurately calculating the positions of the orthogonally polarized antennas, and the use efficiency and practical value of the antenna is high. In addition, the number of the antennas may be extended to multi-antenna configuration, for example, N transmitting antennas and N receiving antennas, and orthogonal polarization isolation is adopted between the transmitting and receiving antennas, that is, the number of the antennas may be extended to N dual-polarized antennas adopted at N transmitting channels and N receiving channels, thereby implementing full-duplex communication under MIMO. In the embodiment of the present invention, the dual-polarized antenna is introduced to the full-duplex communication device, and finally, elimination of an interfering signal around 30 dB may be achieved by using an isolation degree between the polarized antennas. With respect to the problems of high requirements on the number of antennas and position accuracy, a limited coupled signal elimination effect, and a high cost in the prior art, in the embodiment of the present invention, and under the prerequisite that a desirable interfering signal elimination effect is ensured, positions of the dual-polarized antenna need not to be accurately calculated, the limitation of the strict requirement on the antenna position is overcome, and only two polarized antennas are used, thereby reducing the use cost of the antenna, improving practicality of the full-duplex communication, and achieving high practical and promotional values in a microwave communication system and so on In step S502, acquire a second transmitted sub-signal coupled by the transmitted signal output from the first polarized antenna, and adjust an amplitude and a phase parameter of the second transmitted sub-signal to convert the second transmitted sub-signal into a third transmitted sub-signal.

The step S502 includes acquiring, through a preset coupling circuit, the second transmitted sub-signal coupled by the transmitted signal output from the first polarized antenna; and adjusting the amplitude and the phase parameter of the second transmitted sub-signal according to the generated amplitude and phase parameter, to convert the second transmitted sub-signal into the third transmitted sub-signal.

In a specific implementation process, the transmitted signal, after being processed by the transmitting channel, is transmitted at an antenna port of the first polarized antenna configured to output the transmitted signal, where the output transmitted signal is marked as Yout(t). If a coupling circuit is preset in front of the antenna port, a part of the transmitted signal output by the first polarized antenna may be coupled back, where the strength or the amplitude of the coupled signal may be adjusted, and the coupled signal is marked as the second transmitted sub-signal Yfb(t). At this time, the second transmitted sub-signal Yfb(t) is divided into two to be output, where one undergoes processing such as reversing, gain processing and delay adjustment in an analog domain, and the other second transmitted sub-signal Yfb(t) is converted into the second digital signal after undergoing sampling and mode conversion, and is marked as Yfb(n). The Yfb(n) is output to a digital domain in the full-duplex radio communication device, and specifically, may serve as an input signal of an interference elimination controller preset in the digital domain. In addition, the interference elimination controller feeds back a generated amplitude g(t) and a phase parameter t0 to the analog domain at the same time, and adjusts the amplitude and the phase parameter of the second transmitted sub-signal according to the amplitude and the phase parameter to convert the second transmitted sub-signal into the third transmitted sub-signal Yic(t2)=−g(t)*Yfb(t−t0), where it should be noted that "−" identifies that reverse adjustment is performed on the second transmitted sub-signal, and the reverse adjustment may be performed through the phase parameter, or a reverse adjustment unit may be disposed independently.

In step S503, eliminate, according to the third transmitted sub-signal, the interfering signal in the received signal acquired by the second polarized antenna, and sample the received signal, from which the first transmitted sub-signal is eliminated, as a first digital signal.

In a specific implementation process, after the third transmitted sub-signal Yic(t2) is acquired, interfering signal elimination is required to be performed on the received signal acquired by the second polarized antenna, where the received signal includes a wanted signal Xin(t1) and the first transmitted sub-signal Ycoup(t1) that is directly coupled from the first polarized antenna through the air interface. Specifically, since the wanted signal Xin(t1) and the signal Ycoup(t1) directly coupled by the transmitting antenna through the air interface may be received at the antenna port of the receiving channel, and Ycoup(t1) is in strong correlation with a transmitted signal Yout(t) of a transmitting antenna, and the difference only lies in an amplitude Aant, a propagation phase delay t0 of distance and signal attenuation of antenna polarized isolation, Ycoup(t1)=Aant*Yout(t+t0). Therefore, the interfering signal in the received signal is eliminated through the third transmitted sub-signal, that is, the third transmitted sub-signal Yic(t2), Ycoup(t1), and the wanted signal Xin(t1) may pass through a synthesizer, thereby implementing second level interfering signal elimination after first level antenna polarization isolation of the interfering signal, and finally the interfering signal coupled by the transmitted signal to the receiving channel is further effectively reduced, and the wanted signal Xin(t1) may be demodulated normally.

Further, the received signal, from which the first transmitted sub-signal is eliminated, is converted into the first digital signal through analog-to-digital conversion, where the first digital signal may be marked as X(n)=Xin(n)+Ycoup(n)+Yic(n), and the first digital signal is output to the digital domain cancellation module.

In step S504, sample the second transmitted sub-signal as the second digital signal, eliminate the second digital signal in the first digital signal, and output the first digital signal from which the second digital signal is eliminated.

The eliminating the second digital signal in the first digital signal and outputting the first digital signal, from which the second digital signal is eliminated, in step S504 include: eliminating the sampled second digital signal in the first digital signal through a preset interference elimination controller; and outputting the first digital signal, from which the second digital signal is eliminated, and the generated amplitude and phase parameter.

In a specific implementation process, the second digital signal Yfb(n) and the first digital signal X(n) are received, and by using the preset interference elimination controller, the interfering signal in the first digital signal is eliminated in a digital signal field, where the interfering signal is the second digital signal. The digital signal X'(n)=X(n)−Yfb(n), from which the interfering signal is eliminated, is acquired, and X'(n), after being used in demodulation of the received signal, passes through a transmitting channel, and is output through a transmitting polarized antenna. At the same time, the preset interference elimination controller may output a phase and an amplitude parameter to the analog domain, so as to adjust the amplitude and the phase parameter of the second transmitted sub-signal according to the amplitude and the phase parameter, to convert the second transmitted sub-signal into the third transmitted sub-signal in the analog domain. Therefore, the interfering signal elimination process in the digital domain is performed based on and after the interfering signal elimination process in the analog domain, and an interaction influence between the two is added, thereby further improving the elimination effect of the interfering signal.

In the embodiment of the present invention, the full-duplex radio communication method introduces the dual-polarized antenna to a full-duplex communication system, thereby achieving suppression isolation of interference around 30 dB, and by combining the interfering signal elimination processes in the analog domain and the digital domain, the elimination effect is further enhanced, thereby achieving high use and promotional values.

A person of ordinary skill in the art understand that all or a portion of the steps in the method provided by the foregoing embodiments may be implemented by hardware under the instruction of a program. The program may be stored in a computer readable storage medium, such as a read-only memory (ROM)/random-access memory (RAM), a magnetic disk, and an optical disk.

The embodiments of the present invention provide a full-duplex radio communication device including a dual-polarized antenna, an analog domain cancellation module, and a digital domain cancellation module. By introducing the dual-polarized antenna to full-duplex communication, limitation of high requirements on the number of antennas and position accuracy in the prior art is avoided. Through the orthogonal isolation degree between the dual-polarized antennas, the interfering signal strength and antenna use cost are reduced. By combining an analog domain cancellation module and a digital domain cancellation module to perform two-level elimination on the interfering signal, that is, the signal coupled from a sending channel to a receiving channel is effectively eliminated, the problem of performing receiving and sending at the same frequency and same time is solved, thereby implementing full-duplex normal communication.

The foregoing descriptions are merely exemplary embodiments of the present invention, but are not intended to limit the present invention. Any modifications, equivalent substitutions, and improvements made within the spirit and principle of the present invention shall fall within the protection scope of the present invention.

What is claimed is:

1. A full-duplex radio communication device, comprising:
    a dual-polarized antenna;
    an analog domain cancellation module; and
    a digital domain cancellation module,
    wherein a first polarized antenna in the dual-polarized antenna is configured to output a transmitted signal, a second polarized antenna in the dual-polarized antenna is configured to acquire a received signal, and the received signal comprises a wanted signal and a first transmitted sub-signal that is directly coupled from the first polarized antenna through an air interface,
    wherein the analog domain cancellation module is configured to acquire a second transmitted sub-signal coupled by the transmitted signal output from the first polarized antenna, adjust an amplitude and a phase parameter of the second transmitted sub-signal to convert the second transmitted sub-signal into a third transmitted sub-signal, eliminate, according to the third transmitted sub-signal, the first transmitted sub-signal in the received signal acquired by the second polarized antenna, sample the received signal, from which the first transmitted sub-signal is eliminated, as a first digital signal, and output the first digital signal to the digital domain cancellation module, sample the second transmitted sub-signal as a second digital signal at the same time, and output the second digital signal to the digital domain cancellation module, and
    wherein the digital domain cancellation module is configured to eliminate the second digital signal in the first digital signal, and output the first digital signal from which the second digital signal is eliminated.

2. The device according to claim 1, wherein the dual-polarized antenna is in an orthogonally polarized manner, which comprises one polarized antenna being a polarized antenna of +45 degrees, and the other polarized antenna being a polarized antenna of −45 degrees.

3. The device according to claim 1, wherein the dual-polarized antenna is in an orthogonally polarized manner in which one polarized antenna is a vertically polarized antenna and the other polarized antenna is a horizontally polarized antenna.

4. The device according to claim 1, wherein the dual-polarized antenna comprises multiple dual-polarized antennas, which comprise multiple transmitting antennas and a corresponding number of receiving antennas, and orthogonal polarization isolation is adopted between the transmitting antennas and the receiving antennas.

5. The device according to claim 1, wherein the analog domain cancellation module comprises:
  a second transmitted sub-signal acquisition unit configured to acquire, through a preset coupling circuit, the second transmitted sub-signal coupled by the transmitted signal output from the first polarized antenna;
  a first analog-to-digital conversion unit configured to convert the second transmitted sub-signal into the second digital signal through an analog-to-digital conversion, and output the second digital signal to the digital domain cancellation module;
  a third transmitted sub-signal acquisition unit configured to adjust the amplitude and the phase parameter of the second transmitted sub-signal according to an amplitude and a phase parameter sent from the digital domain cancellation module, to convert the second transmitted sub-signal into the third transmitted sub-signal;
  a first interfering signal elimination unit configured to use the third transmitted sub-signal to eliminate the first transmitted sub-signal in the received signal acquired by the second polarized antenna; and
  a second analog-to-digital conversion unit configured to convert the received signal, from which the first transmitted sub-signal is eliminated, into the first digital signal through analog-to-digital conversion, and output the first digital signal to the digital domain cancellation module.

6. The device according to claim 1, wherein the digital domain cancellation module comprises:
  a second interfering signal elimination unit configured to eliminate the second digital signal in the first digital signal through a preset interference elimination controller; and
  an outputting unit configured to output the first digital signal, from which the second digital signal is eliminated, and send the amplitude and the phase parameter to the analog domain cancellation module.

7. A full-duplex radio communication method, comprising:
  outputting, by a first polarized antenna in a dual-polarized antenna, a transmitted signal;
  acquiring, by a second polarized antenna in the dual-polarized antenna, a received signal, wherein the received signal comprises a wanted signal and a first transmitted sub-signal that is directly coupled from the first polarized antenna through an air interface;
  acquiring a second transmitted sub-signal coupled by the transmitted signal output from the first polarized antenna;
  adjusting an amplitude and a phase parameter of the second transmitted sub-signal to convert the second transmitted sub-signal into a third transmitted sub-signal;
  eliminating, according to the third transmitted sub-signal, the first transmitted sub-signal in the received signal acquired by the second polarized antenna;
  sampling the received signal, from which the first transmitted sub-signal is eliminated, as a first digital signal;
  sampling the second transmitted sub-signal as a second digital signal;
  eliminating the second digital signal in the first digital signal; and
  outputting the first digital signal from which the second digital signal is eliminated.

8. The method according to claim 7, wherein the dual-polarized antenna is in an orthogonally polarized manner, which comprises one polarized antenna being a polarized antenna of +45 degrees and the other polarized antenna being a polarized antenna of −45 degrees.

9. The method according to claim 7, wherein the dual-polarized antenna is in an orthogonally polarized manner in which one polarized antenna is a vertically polarized antenna and the other polarized antenna is a horizontally polarized antenna.

10. The method according to claim 7, wherein the dual-polarized antenna is multiple dual-polarized antennas, which comprise multiple transmitting antennas and a corresponding number of receiving antennas, and orthogonal polarization isolation is adopted between the transmitting antennas and the receiving antennas.

11. The method according to claim 7, wherein acquiring the second transmitted sub-signal coupled by the transmitted signal output from the first polarized antenna, and adjusting the amplitude and the phase parameter of the second transmitted sub-signal to convert the second transmitted sub-signal into the third transmitted sub-signal comprises:
  acquiring, through a preset coupling circuit, the second transmitted sub-signal coupled by the transmitted signal output from the first polarized antenna; and
  adjusting the amplitude and the phase parameter of the second transmitted sub-signal according to the generated amplitude and phase parameter, to convert the second transmitted sub-signal into the third transmitted sub-signal.

* * * * *